United States Patent
Fischer et al.

(10) Patent No.: US 12,275,063 B2
(45) Date of Patent: Apr. 15, 2025

(54) DEVICE FOR CLEANING THREE-DIMENSIONAL COMPONENTS MADE OF ADHESIVE POWDER PARTICLES, SAID COMPONENTS BEING PRINTED IN A POWDER BED

(71) Applicant: ACTech GmbH, Freiberg (DE)

(72) Inventors: Jens Fischer, Grossschirma (DE); Norbert Demarczyk, OT Grumbach (DE); Hana Kästner Maxová, Teplice (CZ)

(73) Assignee: ACTECH GmbH, Freiberg (DE)

( * ) Notice: Subject to any disclaimer, the term of this patent is extended or adjusted under 35 U.S.C. 154(b) by 286 days.

(21) Appl. No.: 17/915,294

(22) PCT Filed: Mar. 23, 2021

(86) PCT No.: PCT/DE2021/100291
§ 371 (c)(1),
(2) Date: Nov. 3, 2022

(87) PCT Pub. No.: WO2021/197543
PCT Pub. Date: Oct. 7, 2021

(65) Prior Publication Data
US 2023/0135966 A1    May 4, 2023

(30) Foreign Application Priority Data
Mar. 30, 2020    (DE) .............. 10 2020 108 761.6

(51) Int. Cl.
*B22F 10/68*    (2021.01)
*B08B 3/02*    (2006.01)
(Continued)

(52) U.S. Cl.
CPC .............. *B22F 10/68* (2021.01); *B08B 3/022* (2013.01); *B08B 5/023* (2013.01); *B08B 13/00* (2013.01); *B08B 15/02* (2013.01); *B33Y 40/00* (2014.12)

(58) Field of Classification Search
CPC .. B08B 15/02; B08B 5/02; B08B 3/02; B08B 5/04; B08B 3/022; B08B 5/023;
(Continued)

(56) References Cited

U.S. PATENT DOCUMENTS 9,266,353 B2 *   2/2016   Beier ................. B41J 11/0015
10,189,057 B2    1/2019   Craft et al.
(Continued)

FOREIGN PATENT DOCUMENTS

CN   108500268 A   9/2018
DE   8019194 U1   12/1980
(Continued)

OTHER PUBLICATIONS

International Search Report (English and German) and Written Opinion of the ISA (German) issued in PCT/DE2021/100291, mailed Jun. 24, 2021; ISA/EP.

*Primary Examiner* — Benjamin L Osterhout
(74) *Attorney, Agent, or Firm* — Harness, Dickey & Pierce, P.L.C.

(57) ABSTRACT

The disclosure provides for cleaning three-dimensional (3D) components printed in a powder bed from adhering powder particles. The 3D-printed components are cleaned with a negative pressure-induced volumetric flow. The 3D-printed components are first removed from the powder bed after their manufacture, then positioned on a feed device and moved together with the feed device into a pressure-tight sealable chamber. In the interior of the chamber negative pressure is subsequently built up and a fluid volumetric flow (Continued)

is applied to the 3D-printed component to be cleaned which results in the powder particles being detached from the 3D-printed component. The powder particles are removed from the sealed chamber in a pressure tight manner via at least one channel conduit which is subjected to negative pressure and are fed to a separation device. The chamber is subsequently released of pressure and then opened for removal of the cleaned 3D-printed component.

10 Claims, 2 Drawing Sheets

(51) Int. Cl.
  *B08B 5/02* (2006.01)
  *B08B 13/00* (2006.01)
  *B08B 15/02* (2006.01)
  *B33Y 40/00* (2020.01)

(58) Field of Classification Search
  CPC ......... B08B 13/00; B33Y 40/00; B22F 10/68; Y02P 10/25
  See application file for complete search history.

(56) References Cited

U.S. PATENT DOCUMENTS

| | | | | |
|---|---|---|---|---|
| 10,610,904 B2* | 4/2020 | Tafoya | ................... | B08B 3/102 |
| 11,491,724 B2* | 11/2022 | Hutchinson | ............ | B22F 10/40 |
| 11,534,972 B2* | 12/2022 | Skurkis | ................. | B29C 64/245 |
| 2005/0103360 A1* | 5/2005 | Tafoya | .................... | B08B 3/045 |
| | | | | 134/25.4 |
| 2009/0211616 A1* | 8/2009 | Tafoya | .................... | B08B 3/102 |
| | | | | 134/57 R |
| 2011/0186081 A1* | 8/2011 | Dunn | ...................... | B08B 3/045 |
| | | | | 134/184 |
| 2013/0248491 A1* | 9/2013 | Swanson | ................. | B29C 64/40 |
| | | | | 156/345.23 |
| 2016/0074911 A1* | 3/2016 | Dore | ....................... | B29C 64/35 |
| | | | | 134/56 R |
| 2018/0111319 A1* | 4/2018 | Brezoczky | ............ | B29C 64/255 |
| 2018/0169717 A1 | 6/2018 | David et al. | | |
| 2018/0215096 A1* | 8/2018 | McMahon | .............. | B29C 64/35 |
| 2018/0215106 A1* | 8/2018 | McMahon | .............. | B08B 3/006 |
| 2018/0297284 A1 | 10/2018 | Fulop et al. | | |
| 2021/0039318 A1 | 2/2021 | Monaco et al. | | |
| 2021/0053121 A1* | 2/2021 | Go | .......................... | B22F 10/00 |
| 2021/0197502 A1 | 7/2021 | Kramer et al. | | |

FOREIGN PATENT DOCUMENTS

| | | | | |
|---|---|---|---|---|
| DE | 20006495 U1 | 6/2000 | | |
| DE | 102015215728 A1 | 2/2017 | | |
| DE | 102016109212 A1 | 11/2017 | | |
| DE | 102018000814 A1 | 8/2019 | | |
| DE | 102018121915 B3 | 2/2020 | | |
| WO | WO-2021154221 A1 * | 8/2021 | ............ | B08B 13/00 |
| WO | WO-2021211658 A1 * | 10/2021 | ............ | B08B 15/04 |

* cited by examiner

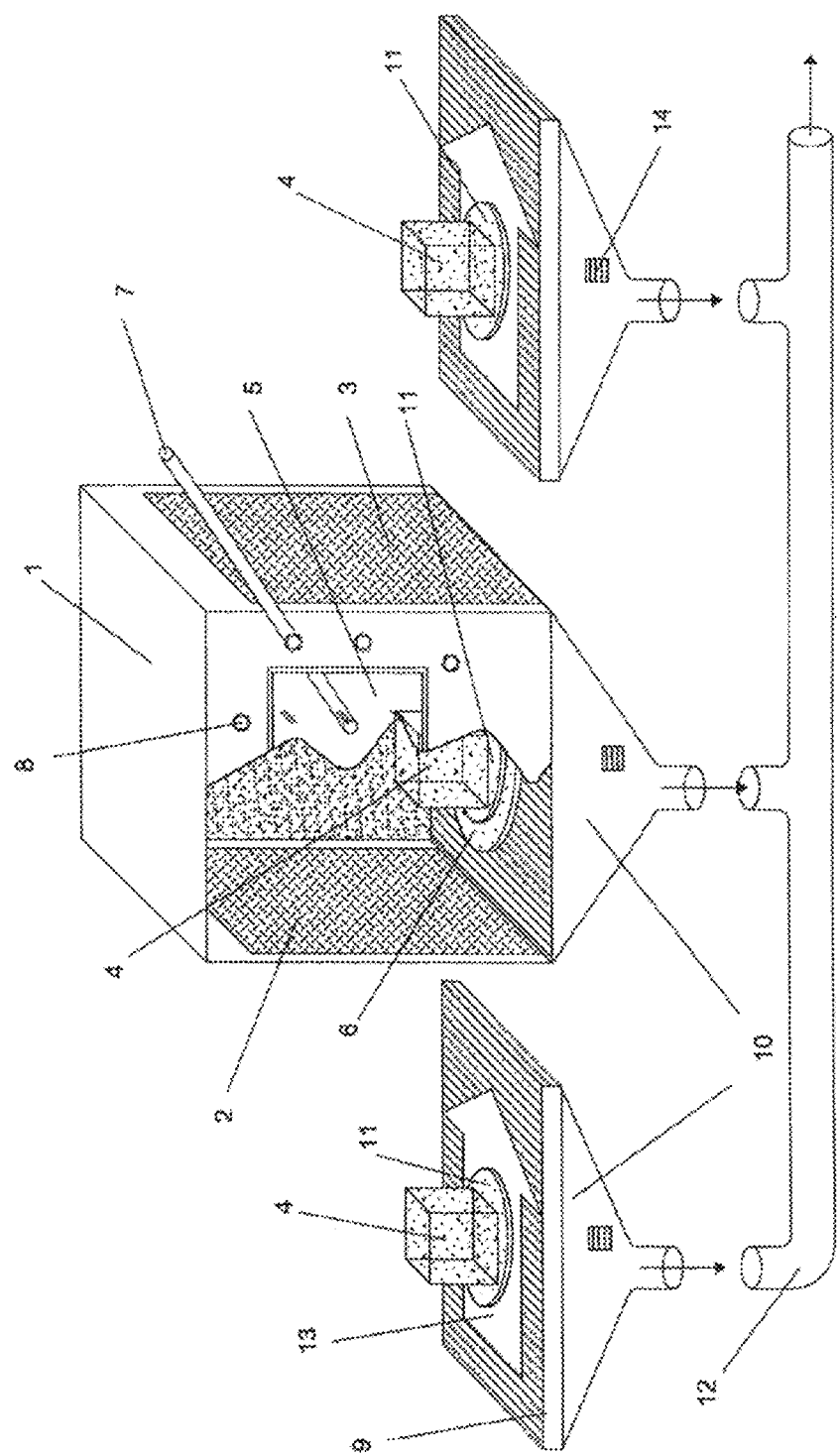

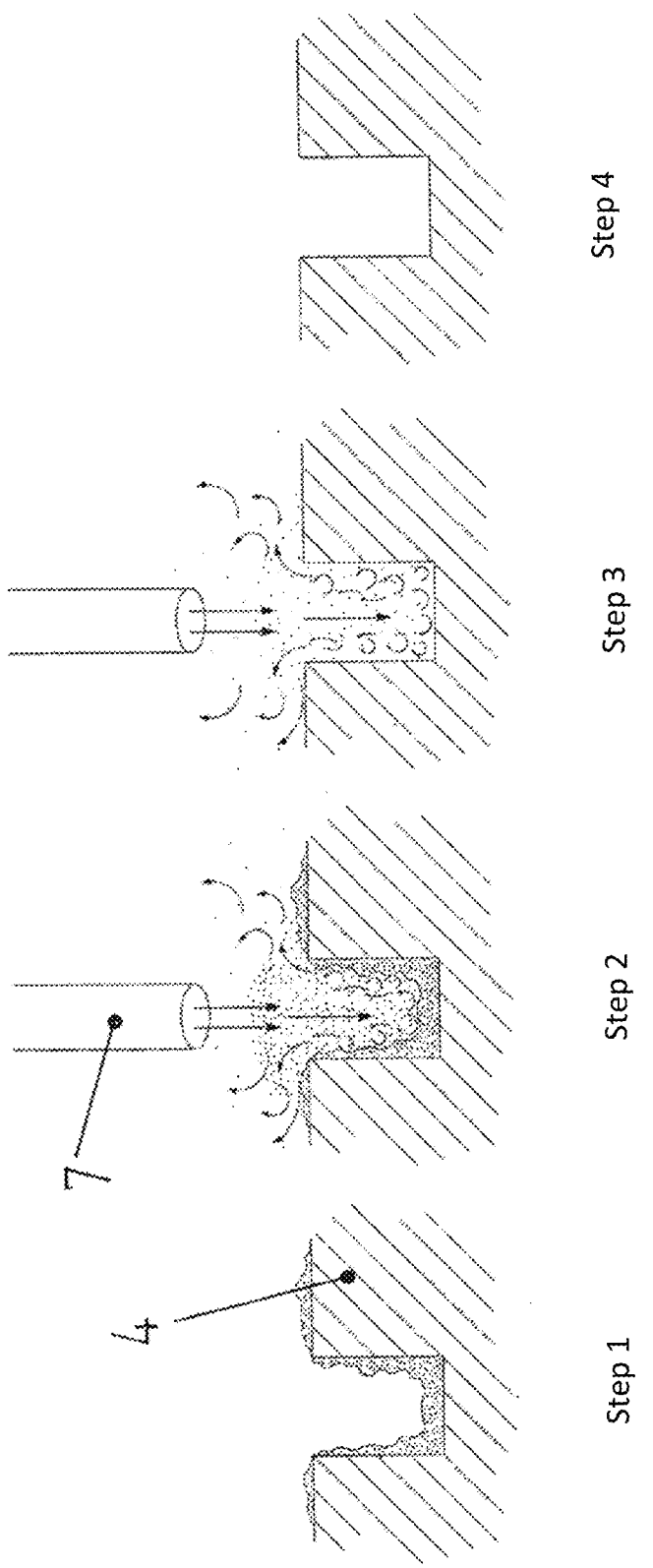

DEVICE FOR CLEANING THREE-DIMENSIONAL COMPONENTS MADE OF ADHESIVE POWDER PARTICLES, SAID COMPONENTS BEING PRINTED IN A POWDER BED

CROSS-REFERENCE TO RELATED APPLICATIONS

This application is a U.S. National Phase Application under 35 U.S.C. 371 of International Application No. PCT/DE2021/100291, filed on Mar. 23, 2021, which claims the benefit of German Patent Application No. 10 2020 108 761.6, filed on Mar. 30, 2020. The entire disclosures of the above applications are incorporated herein by reference.

FIELD

The invention relates to a technical solution for cleaning three-dimensional (3D hereafter) components printed in a powder bed from adhering powder particles.

BACKGROUND

For various applications, technical components are produced using manufacturing processes in which a three-dimensional component is created by a successive layer-by-layer application of liquid or powdered material. Such processes are referred to, for example, as additive manufacturing, generative manufacturing, or rapid prototyping, and are increasingly grouped under the generic term "3D printing", which is also used in the context of the description of the present invention.

A typical technology in this respect is the production of 3D-printed components using the powder bed process. In this process, residual powder particles (for example sand, plastic, or metal) adhering to the surface of the 3D-printed components must be removed before the next process step (for example casting in sand molds, surface finishing, heat treatment of metal-printed parts) in order not to change the geometry of the intended end product.

Until now, such residual powder particles have usually been manually removed from the 3D-printed component by a worker at an open finishing station using compressed air, brushes, vacuum cleaners, and other tools. However, this has significant disadvantages. This is because, despite an associated suction system, there is a high degree of dust formation and thus inevitably a health hazard for the worker. Furthermore, these variants require more processing time and can result in damage to the 3D-printed components.

Alternatively, removal of residual powder particles with a blasting medium is possible. However, disadvantages arise here as well: If the powder material used for printing and the blasting medium used in the blasting process are not of the same type, the material to be removed will be mixed with the blasting medium and cannot be separated by type. Since the high-quality and fine powders used for 3D printing are very cost-intensive, it is mostly not justifiable from a cost point of view to use a powder of the same type as 3D printing when blasting. Consequently, recycling of the separated material requires the separation of the residual powder and the blasting medium, which, regardless of the additional effort involved, can often only be achieved to a limited extent from a technical point of view.

To overcome the disadvantages of the principal processes explained above, a person skilled in the art will endeavor to combine selected features of both processes in an advantageous manner. Several proposed solutions are already known from the patent literature.

For example, US 2018 297 284 A1 describes a system for separating objects in a powder bed. The separation takes place directly in the construction space in which the objects have been created. Molding sand or excess powder is moved by various techniques and preferably blown off the objects. In one variation, it is proposed to extract the material supported by means of a vacuum.

US 101 89 057 B2 proposes a device for removing particles from the surface of a 3D-printed workpiece. Here, the workpiece is arranged on a rotatable platform in an enclosure that has an opening for handling the workpiece. A pressurized fluid is applied to the workpiece. The pressurized fluid and the vibration of the platform remove excess powder from the workpiece, which falls down because of gravity. Here, too, suction by means of a vacuum is suggested as an alternative.

The subject matter of CN 108 500 268 A is a system for additive manufactured components, in which excess powder is removed from the components with an air blowing device and transported away by means of an air extraction device. The powder enters a collecting container via a pipeline and associated sieves.

DE 10 2016 109 212 A1 proposes the cleaning of components from adhering powder particles by means of vibration. For this purpose, the entire component is vibrated. Build platforms are provided for connecting the vibration to the component, wherein a friction-locked connection between the vibration generator and the component is identified as the preferred embodiment. However, such a connection of the components to a build platform is not possible or at least not common for numerous applications (e.g.: 3D-printing of sand parts). Therefore, many devices do not have such build platforms at all. In addition, cleaning by means of vibration is not possible anyway for three-dimensionally printed sand parts because such components do not couple well and would be destroyed due to their low strength.

The prior art explained above does convey the suggestion of applying a vacuum, or at least negative pressure, to 3D-printed components to loosen and transport excess powder particles. However, there are no specific indications from the references as to how the relevant processes or devices for three-dimensional objects printed in a powder bed should be designed, particularly to be able to clean poorly accessible contoured sections from adhering powder particles.

SUMMARY

It is the object of this invention to create a technical solution with which residual adhering powder particles can be removed from components which are 3D-printed using the powder bed process in a manner that is advantageous compared to the prior art, so that the finishing process can be done more efficient, and the quality and reproducibility can be increased. In particular, effective cleaning of undercut and difficult-to-see contours of a 3D-printed component is to be achieved. Furthermore, the dust exposure for the worker at the workplace is reduced and an effective collection of the removed material for later recycling is to be implemented.

This object is achieved in that the device comprises at least one component carrier for receiving a 3D-printed component to be cleaned and a housing designed as a particle extraction chamber, wherein the component carrier has a perforated base and is movable into the housing by means of a transport system, wherein the housing comprises at least one door which can be closed in a pressure-tight manner for inserting and removing the component carrier, wherein a platform which can be moved in multiple axes is arranged in the housing for receiving a 3D-printed component to be cleaned, wherein the interior of the housing is operatively connected to a device for generating negative pressure, wherein the housing comprises one or more openings which can be closed in a pressure-tight manner and in each of which tubular supply lines are arranged, in which said tubular supply lines open into the interior of the housing and by means of which a volumetric flow can be generated in the interior of the housing, and wherein the component carrier and the interior of the housing are each connected via a collection hopper to a conduit system which is subjected to negative pressure and is operatively connected to a separating device. Further embodiments are the subject matter of dependent claims and are described in more detail in the exemplary embodiment.

By using the device according to the invention, the adhering powder particles because of manufacturing in a powder bed are effectively removed from the surface of the 3D-printed components by means of a negative pressure-induced volumetric flow without the addition of a blasting medium. The design with tubular supply lines is particularly advantageous to achieve a targeted application of a negative pressure-induced volumetric flow to selected component sections, which results in good removal of adhering powder particles from the component sections to which the flow is applied, and thus resulting in a good cleaning effect.

The removed material is not contaminated by a foreign blasting medium and can, therefore, be reused. Automatic recycling is also possible if inline measurement of the suitability of quality parameters is performed.

Cleaning with a negative pressure-induced volumetric flow is easier than the previously used manual finishing because the worker does not have to touch the entire surface of the component to be finished with their hand or a brush. The generated volumetric flow ensures perfect finishing even of undercut contours. When applied in doses, there will be no damage to the surface during finishing. The surface is properly cleaned. Due to the necessary application of negative pressure to the surfaces to be cleaned, cleaning is carried out in a pressure-tight housing. Therefore, the worker has no direct contact with the material to be removed during cleaning and thus the worker is not exposed to dust emissions.

DRAWINGS

The exemplary embodiment of the invention is explained below with reference to the drawing. Wherein:

FIG. 1 shows the basic technical structure of the device in a stylized view.

FIG. 2 shows an exemplary stylized functional sequence for removing residual powder particles using the device according to FIG. 1 in four successive steps.

DESCRIPTION

FIG. 1 shows an embodiment of the device in the form of a production line with means of transport. Such a design enables advantageous integration into production sections that can be automated. However, the device is equally suitable for manual handling.

Regardless of the specific embodiment, the 3D-printed components 4 are first manufactured in a commonly known manner in a powder bed not shown in more detail here. After completion of the production or completion of a production step, these 3D-printed components 4 are extracted manually or automatically and placed on a component carrier 11. In manual handling, the component carrier 11 is then manually fed to a housing 1 functionally designed as a particle extraction chamber. However, the preferred use of the device as a component of a production line is described below.

Multiple similar component carriers 11 are provided for a cleaning process that can be automated. The component carriers 11 have a perforated base, through the openings of which a downward trickling of falling powder particles or other small material particles is enabled due to gravity.

The component carriers 11 are arranged on a transport system 9. The transport system 9 includes a conveyor unit 13 (e.g.: a roller conveyor) and a collection hopper 10 for detached powder particles.

Through gaps in the transport system 9, for example, through free spaces between two adjacent rollers of the conveyor unit 13, which is designed as a roller conveyor, powder particles or other small material particles which fall off the perforated bottom of the component carrier 11 can continue to fall downwards because of gravity. This effect can be additionally supported by an optionally associated vibration unit 14. At least one collection hopper 10 is arranged below the conveyor unit 13, the outlet of which is in operative connection with a conduit system 12. Powder particles or other material particles are transported away through the conduit system 12 by means of negative pressure.

After a first 3D-printed component 4 has been placed on the component carrier 11 as shown on the left in FIG. 1, said component carrier 11 is moved in the direction of the housing 1 with the aid of the transport system 9, i.e., to the right according to FIG. 1. The respective movements are indicated in FIG. 1 by arrows on the top of the transport system 9.

In the subsequent progression, the component carrier 11 with the 3D-printed component 4 is inserted into the housing 1. The housing 1 comprises of at least one door for inserting and removing the component carriers 11. In the preferred embodiment according to the drawing, the housing 1 is equipped with two doors 2 and 3. The doors 2 and 3 are arranged on opposing side surfaces of the housing 1 in the contour progression of the transport system 9 and are each designed as pressure-tight sealable openings for loading and unloading 3D-printed components 4. Consequently, the device can operate according to the continuous flow principle, and universal integration into production lines is possible. The arrangement of the doors can be adapted to the requirements of the production line, lateral positions as well as ceiling or floor openings can be implemented. Optionally, the housing 1 can be designed with an inspection window 5, so that the interior is also visible during cleaning. In the housing 1, the component carrier 11 with the 3D-printed component 4 is located on a platform 6 that can be moved in multiple axes. This provides access to the 3D-printed component 4 to be cleaned from all sides. Now, doors 2 and 3 are sealed pressure-tight.

Subsequently, negative pressure is generated in housing 1 by a device suitable for this purpose (for example, a vacuum pump). This negative pressure is adjustable. The housing 1 has one or more openings 8 which can be closed in a pressure-tight manner and in each of which tubular supply lines 7 can be arranged which pass through the housing 1. These rigidly or flexibly designed supply lines 7 are used to generate a volumetric flow in the housing 1.

This volumetric flow can be controlled by the negative pressure in the housing 1. For example, ambient air can be used as the medium for the volumetric flow, or fluids from a tank, for example liquids, gases, or aerosols. The volumetric flow is directed specifically at the 3D-printed component 4 to be cleaned by means of the movable tubular supply lines 7.

When the volumetric flow hits the 3D-printed component 4, it detaches the adhering powder particles in its range of action on the surface of the 3D-printed component 4. The now detached powder particles whirl up and, through their movement, also detach other adhering powder particles. The kinetic energy of the powder particles accelerated by the volumetric flow is used for this purpose. The energy input can be further increased by modulating the volumetric flow by means of pulses. This briefly results in a stronger pulsating volumetric flow compared to the basic volumetric flow, which leads to a greater acceleration of the particles. This allows an additional reaction to various surface designs of the part to be cleaned. Such modulation of the volumetric flow can preferably be implemented with an electromagnetically controlled proportional valve (not shown in the drawing).

The negative pressure applied prevents the detached powder particles from reattaching to the surface of the 3D-printed component 4 to be cleaned. Instead, they remain in motion and are captured by the volumetric flow indicated by the negative pressure in the housing 1 and transported through the conduit system 12 to a separation device not shown.

By using the device according to the invention, in contrast to pressure blasting, it is thus avoided that pocket-shaped contour areas fill with powder particles and a blasting effect is prevented. In this way, an efficient cleaning effect is achieved, particularly in narrow contour areas such as ribbing, blind holes, and the like. Furthermore, there is a self-securing effect preventing too harsh and thus contour-damaging treatment since the detached particles are removed from the working zone by being transported away and are thus not endlessly available. Once the loose material is removed, the cleaning effect ceases as well.

FIG. 2 shows an example of the detachment and removal of powder particles or other small material residues from a poorly accessible contour section of a 3D-printed component 4 in four successive process steps. The contour section to be cleaned here has, for example, a recess with a rectangular cross-section. Step 1 shows the condition after completion of the production in the powder bed. Powder particles have accumulated on the side surface and on the bottom of the recess, as well as in the edge area next to the entry cross-section of the recess. In step 2, a fluid is supplied via the tubular supply lines 7 in the direction of the bottom surface of the recess, with the application of the fluid, the first powder particles are detached and removed upwards from the recess. In step 3, some of the already detached powder particles entrain other powder particles as a result of their movement. In addition, other powder particles are detached and removed from the area of the recess by the fluid that continues to be supplied. In step 4, all powder particles are detached from the recess and removed, so that the contour section shown is now completely cleaned of adhering powder particles and other material residues.

During cleaning, the 3D-printed component 4 is moved into the housing 1 by means of the movable platform 6, so that its entire surface is exposed to fluid volumetric flow. Movement of the platform 6 can either be performed by manual or by automatic control. To achieve an even greater removal effect, an additional blasting medium can also be introduced onto the component 4 through the tubular supply lines 7. However, the problems explained above with the use of foreign material must be considered, so that primarily material of the same type in the form of used powder or new material should be used.

When cleaning is complete, the negative pressure in housing 1 is released and both doors 2 and 3 are opened. Then the component carrier 11 with the cleaned 3D-printed component 4 is moved out of the housing 1 through a door 2 or 3 onto the transport system 9.

From the previous description, it can be seen that the device according to the invention has two basic components-a working area and a separation area. The working area includes the pressure-tight housing 1, the movable tubular supply lines 7 for the volumetric flow, and the transport system 9. The separation area includes an assembly for generating the negative pressure, a filter system, and separating devices. Double separation and suitable filters ensure that dust-free air exits the system.

The pressure-tight sealable doors 2 and 3, the transport system 9, the movable platform 6, and the tubular supply lines 7 can be operated manually. Preferably, however, the functions of the device, such as movement of the transport system 9, generation and application of negative pressure, opening and closing of door 2 or 3, movement of the platform 6, manipulation of the volumetric flow, etc., are controlled by a control panel. It is also possible for the pressure-tight sealable doors 2 and 3, the transport system 9, the movable platform 6 and the tubular supply lines 7 to be controlled by actuators and a programmable logic controller.

The invention claimed is:

1. A device for detaching residual powder particles adhered to a 3D-printed component after the 3D-printed component is removed from a powder bed utilized for manufacturing the 3D-printed component, the device comprising:
    a housing comprising an outer wall and defining an interior space comprising a particle extraction chamber, at least one door providing access to the interior space, wherein the at least one door is movable between an opened position and a closed position, and, when in the closed position, seals the housing and the interior space in a pressure-tight manner, at least one opening through the outer wall, and a tubular supply line extending through the opening and into the particle extraction chamber, the tubular supply line being sealed in the opening in a pressure-tight manner;
    a component carrier comprising a perforated base configured to support the 3D-printed component;
    a transport system configured to support the component carrier and the 3D-printed component and to move the component carrier and the 3D-printed component into and out of the interior space;
    a platform located in the particle extraction chamber, the platform being movable in multiple axes and configured to support the component carrier and the 3D-printed component;
    wherein the housing is operatively connected to a pump for generating negative pressure in the particle extraction chamber;
    wherein the tubular supply line is operable to direct a negative pressure-induced volumetric flow of a fluid to the 3D-printed component to detach the residual powder particles from the 3D-printed component; and
    wherein the component carrier and the particle extraction chamber are each operatively connected to a conduit system and a particle separating device by a collection hopper configured to receive the residual powder particles detached from the 3D-printed component.

2. The device according to claim 1 wherein the transport system comprises a roller conveyor.

3. The device according to claim 1 wherein the housing comprises two doors which are arranged on mutually opposing side walls of the housing.

4. The device according to claim 1 wherein the door, the transport system, the platform, and the tubular supply line are operated one of manually or by automatic control.

5. The device according to claim 1 wherein the door, the transport system, the platform, and the tubular supply lines are controlled by actuators and a programmable logic controller.

6. The device according to claim 1 wherein the volumetric flow can be modulated.

7. The device according to claim 6 wherein the device comprises an electromagnetically controlled proportional valve with which the volumetric flow can be modulated.

8. The device according to claim 1 wherein the fluid is ambient air.

9. The device according to claim 1 wherein the fluid is one of a liquid, a gas, or an aerosol.

10. The device according to claim 9 wherein the fluid is supplied by a tank.

* * * * *